United States Patent
Woods et al.

(10) Patent No.: US 6,667,459 B1
(45) Date of Patent: Dec. 23, 2003

(54) CONFIGURABLE NOZZLE BAFFLE APPARATUS AND METHOD

(75) Inventors: Kenneth J. Woods, Lebanon, NH (US); Charles M. Hackett, Hanover, NH (US); Robert C. Dean, Jr., Norwich, VT (US); Sanjay Garg, Grantham, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 09/717,775

(22) Filed: Nov. 21, 2000

(51) Int. Cl.⁷ .......................... B23K 26/14; B23K 10/00
(52) U.S. Cl. ................. 219/121.84; 219/121.5; 219/121.67; 239/590
(58) Field of Search ............... 219/121.84, 121.67, 219/121.48, 121.5, 121.71; 239/590–591, 309, 343

(56) References Cited

U.S. PATENT DOCUMENTS

| | | | |
|---|---|---|---|
| 3,148,263 A | 9/1964 | Jensen | |
| 4,031,351 A | 6/1977 | Martin | |
| 4,625,094 A | 11/1986 | Marhic et al. | |
| 4,762,977 A | 8/1988 | Browning | |
| 5,220,149 A | 6/1993 | Neidhardt | 219/121.84 |
| 5,393,952 A | 2/1995 | Yamaguchi et al. | 219/121.5 |
| 5,565,120 A | 10/1996 | La Rocca | 219/121.84 |
| 5,700,989 A * | 12/1997 | Dykhno et al. | 219/121.84 |
| 5,786,561 A | 7/1998 | Zefferer et al. | 219/121.84 |
| 5,906,758 A | 5/1999 | Severance | 219/121.5 |
| 6,084,199 A | 7/2000 | Lindsay et al. | 219/121.5 |
| 6,118,097 A | 9/2000 | Kaga et al. | 219/121.84 |
| 6,172,323 B1 * | 1/2001 | Ishide et al. | 219/121.5 |

FOREIGN PATENT DOCUMENTS

| | | | |
|---|---|---|---|
| DE | 19725256 A1 * | 12/1998 | |
| EP | 0 458 181 A | 11/1991 | |
| EP | 0 985 484 A2 | 3/2000 | |
| JP | 50-135721 | 11/1975 | |
| JP | 51-16379 | 5/1976 | |
| JP | 51-21945 | 7/1976 | |
| JP | 52-36725 | 3/1977 | |
| JP | 62-28084 | 2/1987 | |
| JP | 63-108992 A * | 5/1988 | 219/121.84 |
| JP | 63-180378 | 7/1988 | |
| JP | 03 101226 A | 4/1991 | |
| JP | 8-66785 A * | 3/1996 | |
| JP | 8-66786 A * | 3/1996 | |
| JP | 08118063 | 5/1996 | |
| JP | 9-168877 A * | 6/1997 | |
| JP | 9-234578 A * | 9/1997 | |
| JP | 11104879 | 4/1999 | |
| JP | 11277288 | 10/1999 | |
| JP | 11-347772 A * | 12/1999 | |
| SU | 188276 | 10/1966 | |
| SU | 1234104 A1 | 5/1986 | |
| WO | WO88/01553 | 3/1988 | |
| WO | WO98/56534 | 12/1998 | |

* cited by examiner

*Primary Examiner*—Geoffrey S. Evans
(74) *Attorney, Agent, or Firm*—Testa, Hurwitz & Thibeault, LLP

(57) ABSTRACT

A configurable baffle to configure fluid flow through a nozzle. To improve the quality and accuracy of processing apparatus used in the cutting, welding, and heat treating of materials, a self-aligning nozzle includes a configurable baffle. This configurable baffle can be a metallic grid (e.g., a screen) or other type of membrane (e.g., porous, permeable, etc.). During its initial use in the processing apparatus, this configurable baffle is tailored with an energy beam, such as a laser beam or plasma jet, to create an optimal fluid flow velocity profile. When the configurable baffle deteriorates from use, it is easily replaced by another baffle or by using an in situ replacement mechanism. To ensure proper alignment between the nozzle and the energy beam, mating contoured surfaces are used among adjacent components. Threaded surfaces can also be employed to assist in achieving the proper coaxial alignment.

49 Claims, 5 Drawing Sheets

CONFIGURABLE NOZZLE BAFFLE APPARATUS AND METHOD

CROSS-REFERENCE TO RELATED APPLICATIONS

Application Ser. No. 09/631,814, now U.S. Pat. No. 6,424,082, assigned to the assignee of the present invention, is incorporated herein by reference.

FIELD OF THE INVENTION

The present invention relates generally to a material processing apparatus and, more specifically, to a nozzle used therein and apparatus and methods for regulating flow through such nozzle.

BACKGROUND OF THE INVENTION

Material processing apparatus, such as lasers and plasma arc torches, are widely used in the cutting, welding, and heat treating of metallic materials. A laser-based apparatus generally includes a nozzle through which a gas stream and laser beam pass to interact with a workpiece. The laser beam heats the workpiece. Both the beam and the gas stream exit the nozzle through an orifice and impinge on a target area of the workpiece. The resulting heating of the workpiece, combined with any chemical reaction between the gas and workpiece material, serves to heat, liquefy or vaporize the selected area of workpiece, depending on the focal point and energy level of the beam. This action allows the operator to cut or otherwise modify the workpiece.

Similarly, a plasma arc torch generally includes a cathode block with an electrode mounted therein, a nozzle with a central exit orifice mounted within a torch body, electrical connections, passages for cooling and arc control fluids, a swirl ring to control fluid flow patterns in the plasma chamber formed between the electrode and nozzle, and a power supply. The torch produces a plasma arc, which is a constricted ionized jet of a plasma gas with high temperature and high momentum that exits through the nozzle orifice and impinges on the workpiece. Gases used in the torch can be non-reactive (e.g., argon or nitrogen), or reactive (e.g., oxygen or air).

It is generally desirable that the results of any material processing be of high quality. For example, the edges of the cut kerf produced by laser and plasma cutting should be straight and uniform. Edge irregularities caused by, for example, uneven heating of the workpiece by the laser, excessive chemical reactions between the assist gas and workpiece, or incomplete removal of cutting debris, should be minimized.

One way to improve process quality is by optimizing the flow of gas that impinges on the workpiece coincident with the energy beam. This gas, sometimes called an "assist gas" or a "cutting gas," can be supplied through a single nozzle or a multitude of nozzles. In the case of a single nozzle, the assist gas flow can be optimized by the nozzle contour to achieve the desired flow characteristics (see, for example, U.S. Pat. No. 6,118,097 and Japanese Patent No. 8118063). In the case of a multiple nozzle design, the additional nozzles can be distributed around the central nozzle in a discrete or axisymmetric fashion (see, for example, U.S. Pat. No. 5,786,561).

In the case of oxygen assisted laser cutting, the assist gas flow must be adjusted to provide sufficient shear force to the liquefied material in order to ensure complete removal of the liquid (leaving no dross). Concurrently, the level of workpiece oxidization must be controlled to prevent excessive material removal. These two limitations oppose each other in most laser cutting applications because the oxygen velocity must be increased to remove the liquid metal more effectively. Nevertheless, since the nozzle diameter is larger than the laser beam and therefore the kerf width, the increased oxygen velocity increases the stagnation pressure near the kerf entrance region that promotes unwanted material burning and poor cutting quality.

Increasing gas pressure to improve system performance has drawbacks. First, it increases gas consumption. This degrades the operational efficiency of the cutting apparatus.

Second, increasing gas pressure can enlarge the width of the laser cut due to "overburning" when a reactive gas is used. This occurs because the increased pressure expands the physical scope of the reaction between the gas and the workpiece (e.g., by enhancing oxidation) beyond the dimensions of the laser beam. This is generally undesirable in the material processing industry, where narrow cuts are favored.

Finally, the increased gas pressure tends to damage the top area of the kerf, resulting in a "ragged" or "jagged" edge. One manifestation of this occurs when cut pieces fail to separate because the irregularities on their adjacent cut faces become seized.

Nozzles with multiple orifices may be used to modify the gas flow for impact on the workpiece. Such nozzles typically allow a laser beam and a gas to pass through an oversized center orifice. Several other orifices surrounding the center orifice, either concentrically or peripherally, also can deliver gas to the workpiece. An example of this is a "shower nozzle" where several smaller peripheral orifices encircle the large center orifice. In nozzles with multiple orifices, it is possible to isolate each orifice from the other orifices. This would allow, for example, each orifice to deliver independent gas flows at different pressures to different areas of the workpiece located under the nozzle. Through such tailoring of the gas flows, the quality of the cut can be improved. For example, regions of the cut that would benefit from a high pressure gas flow (e.g., the deep parts of the cut) would be subjected to such a flow that could be delivered through one or more orifices of the nozzle adjacent to that region. Conversely, workpiece regions better served by a low pressure gas flow (e.g., the top area of the kerf) would receive a low pressure flow from one or more different orifices adjacent to that region. This delivery of high pressure and low pressure gas flows would occur concurrently and be provided through a single nozzle. It should be noted, though, that nozzles with multiple orifices can be complicated to manufacture. Furthermore, to achieve the positional accuracy between the specific gas flows and selected regions of the workpiece requires maintaining alignment between the laser beam and the centerline of the nozzle. This can be difficult to attain in the typical rugged field environment.

Also important in the operation of the material processing apparatus is the accuracy of the cut. For example, the location of the laser beam relative to the centerline of the nozzle orifice influences accuracy. Depending on the direction of the cut, any misalignment can result in the production of workpieces with improper dimensions and distorted edges. Asymmetric wear of the nozzle orifice also typically results when the energy source is a plasma jet, requiring premature replacement of the nozzle. Because nozzle replacement is ideally performed in the field, typically under harsh conditions, it is desirable that proper alignment of the energy beam and gas flow be achieved quickly and without difficulty.

From the foregoing, it will be apparent that there exists a need for a low cost, readily manufacturable and easily replaceable nozzle that can create the gas velocity profile necessary to produce high quality, accurate cuts. Such a nozzle should also promote efficient apparatus operation and be easy to align with the laser beam.

SUMMARY OF THE INVENTION

The present invention features a material processing apparatus that includes a nozzle having a baffle that creates a gas velocity profile that improves the quality and accuracy of, for example, cuts made in a workpiece. Additionally, the nozzle aligns itself with the axis of an energy beam that is a component of the material processing apparatus, further improving accuracy and increasing its operational lifetime. Calibration of the baffle and alignment of the nozzle occur with little or no user intervention, making the invention simple to operate, which is desirable under typically rugged field conditions.

In one embodiment, a material processing apparatus includes an energy source, such as a laser or plasma source, which provides an energy beam. The beam passes into a processing head assembly that includes a chamber or plenum to receive a fluid, such as an assist gas. The processing head assembly also includes a nozzle having a central exit orifice and a configurable baffle. The configurable baffle is disposed in the central exit orifice of the nozzle. The configurable baffle can have an opening that is substantially coincident with the nozzle central exit orifice, and is perpendicular to the axis of propagation of the beam. This opening can be formed by the energy beam so as to have a dimension substantially equivalent to the cross sectional area of the beam. The beam and the fluid pass through the configurable baffle and the orifice, causing the fluid to exit the orifice with a defined velocity profile.

In another embodiment, a processing head apparatus includes a chamber or plenum for receiving a fluid, a nozzle having a central exit orifice, and a configurable baffle. The fluid passes through the configurable baffle and the orifice, exiting the orifice with a defined velocity profile. The configurable baffle is disposed in the central exit orifice of the nozzle. The configurable baffle can have an opening that is substantially coincident with the nozzle central exit orifice. This opening is perpendicular to the axis of propagation of an energy beam, such as a laser beam or plasma. The opening can be formed by the energy beam and, as a result, has a dimension substantially equivalent to the cross sectional area of the beam.

The configurable baffle can be, for example, a distributed flow resistance structure. In some embodiments, this structure can include a metallic element configured, for example, as a grid. In other embodiments, the structure can be a permeable or porous membrane.

In another embodiment, a laser-equipped material processing apparatus includes a nozzle having a surface contoured over a predetermined axial extent. When installed in a processing head assembly, the contoured surface of the nozzle mates with adjacent structure, thereby aligning the axis of the nozzle with the axis of the processing head assembly.

In another embodiment, the invention features a consumable used in material processing apparatus. The consumable includes a nozzle having a central exit orifice and an outer member that circumscribes the nozzle. The outer member has an outer central exit orifice that aligns with the nozzle central exit orifice. In this embodiment, a configurable baffle is placed relative to the nozzle and the outer member to be coincident with the orifices. The outer member can be, for example, a second (or "outer") nozzle, thereby creating a two-piece nozzle structure. The outer member can also be a shield, which can be used to minimize damage to the nozzle during apparatus operation. The consumable can also have a threaded surface for engaging adjacent structure when installed in a processing head assembly.

In a further embodiment, the configurable baffle in the consumable includes a quantity of baffle material. As one portion of this baffle material deteriorates from use, it can be moved away from the nozzle central exit orifice and replaced by a new portion of baffle material. A mechanism to move the baffle material can include, by way of example, a supply reel that holds unused baffle material and a take-up reel that receives the used baffle material.

In another embodiment, the invention features a nozzle having a central exit orifice and a configurable baffle placed relative to the orifice. The configurable baffle can include, for example, a frame that is sized to achieve a friction fit with the central exit orifice. Preferably, the configurable baffle has an opening that is substantially coincident with the central exit orifice. As discussed above, the opening is perpendicular to the axis of propagation of an energy beam impinging on, or passing through, or both, the baffle. The opening is formed by the energy beam and, as a result, has a dimension substantially equivalent to the cross sectional area of the beam.

In yet another embodiment, the invention features a method of forming a configurable baffle placed relative to a nozzle in a processing head assembly. The method includes the steps of, for example, securing the configurable baffle to a central exit orifice of the nozzle, emitting an energy beam from an energy source, and directing that beam onto the configurable baffle. A result is the selective removal of a portion of the configurable baffle, thereby defining a baffle opening that is coincident with the central exit orifice. The energy source can be, for example, a laser or plasma source, making the energy beam a laser beam or a plasma jet, respectively.

One embodiment of the invention features a method of processing a workpiece. The method includes the steps of, for example, providing an energy source and a processing head assembly having a chamber, nozzle, and configurable baffle. The configurable baffle is typically placed relative to the nozzle and the nozzle includes a central exit orifice. Both the nozzle and configurable baffle are in fluid communication with the chamber, into which an assist gas is directed. Generally, the energy source is activated to transmit an energy beam through the configurable baffle and central exit orifice. The assist gas also travels through the configurable baffle and central exit orifice. The gas typically exits the central exit orifice with a flow velocity that is reduced by the configurable baffle in the area surrounding the energy beam relative to the flow velocity through the cross-sectional area of the energy beam. As mentioned above, the energy source can be, for example, a laser or plasma source, making the energy beam a laser beam or a plasma jet, respectively.

In an example configuration, an embodiment of the invention features a material processing apparatus that includes a gas source, a laser source that provides a laser beam, and a processing head assembly. The processing head assembly is in optical communication with the laser source and in fluid communication with a plenum that receives the gas. Included in the processing head assembly is a nozzle having a central exit orifice through which the laser beam and gas pass. To configure the gas flow passing through the central exit orifice, a configurable baffle is placed relative to the nozzle. The configurable baffle has an opening that is perpendicular to the axis of propagation of the laser beam and is substantially coincident with the central exit orifice. Preferably, the dimension of the opening is substantially equivalent to the cross sectional area of the laser beam. In one embodiment, this is achieved by having the laser beam form the opening.

In another example configuration, an embodiment of the invention features a processing head assembly that includes a plenum for receiving a gas and a nozzle in fluid communication with the plenum. The nozzle includes a central exit orifice and a configurable baffle is placed relative to the nozzle. The configurable baffle can be, for example, a metallic grid (e.g., a screen). As discussed above, the configurable baffle has an opening that is perpendicular to the axis of propagation of the laser beam and is substantially coincident with the central exit orifice. Preferably, the dimension of the opening is substantially equivalent to the cross sectional area of the laser beam. In one embodiment, this is achieved by having the laser beam form the opening.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which:

FIG. 2A is a close-up schematic sectional view of a nozzle in accordance with an embodiment of the present invention;

DETAILED DESCRIPTION

Figure 1:
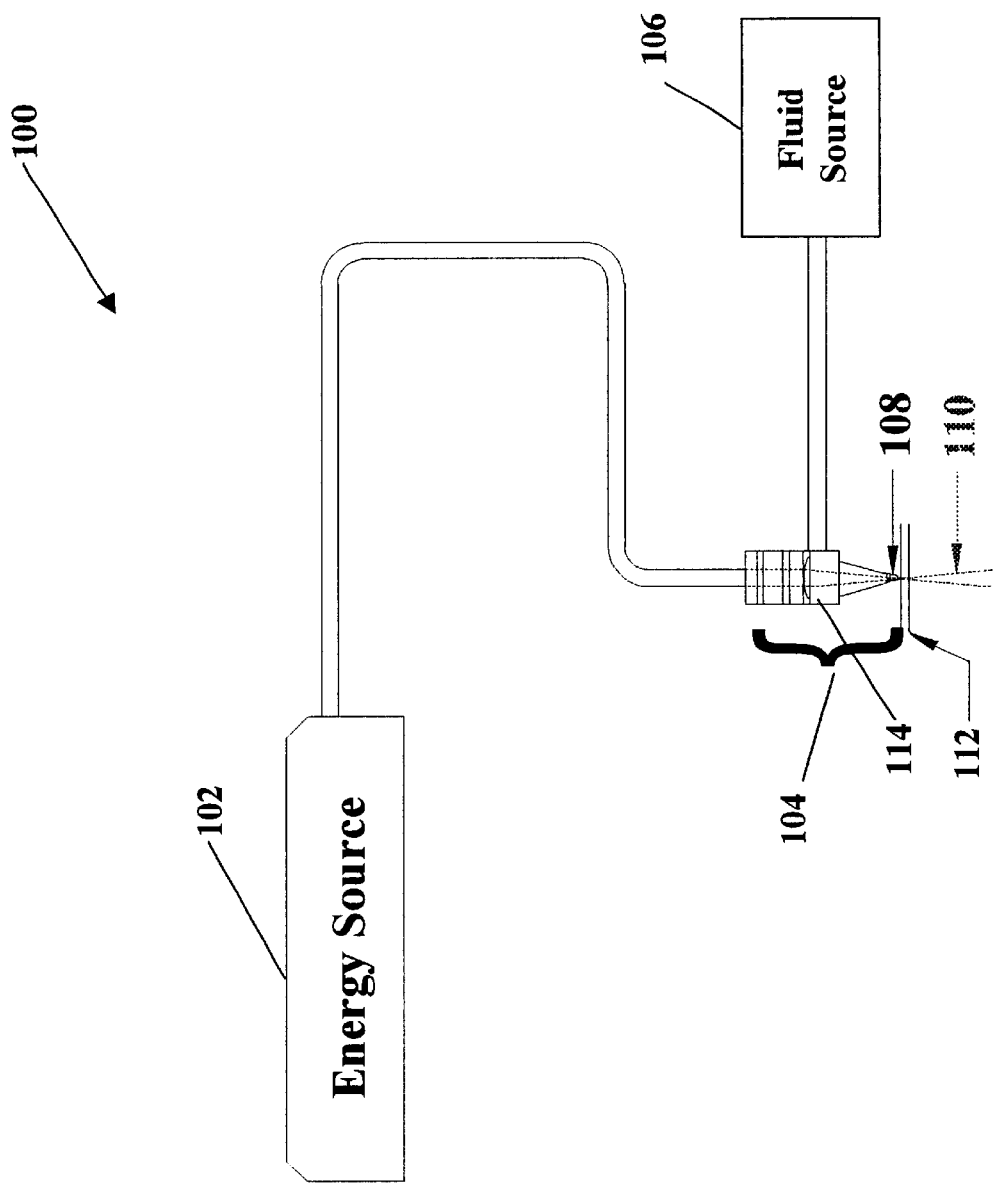
FIG. 1 is a block diagram of a material processing apparatus in accordance with an embodiment of the present invention.

As shown in the drawings for the purposes of illustration, a system according to the invention improves the quality and accuracy of cuts made in a workpiece and needs little or no user intervention for calibration and alignment. A nozzle for material processing apparatus according to the invention includes a configurable baffle that configures the fluid (i.e., gas) flow passing through it. The baffle can have an opening formed by, for example, an impinging energy beam generated by the processing apparatus. Consequently, this opening is coaxial with, and has a dimension substantially equivalent to, the cross-sectional area of the energy beam. This configuration represents a simple and cost effective way to tailor a fluid flow within and about an energy beam while avoiding the problems associated with misalignment. It also results in a close match between the nozzle, baffle, and the particular material processing apparatus used.

FIG. 1 shows a schematic sectional view of an embodiment of a material processing system 100. An energy source 102 generates an energy beam 110 and delivers it to a processing head assembly 104. A fluid source 106 supplies a fluid, such as an assist gas, to the processing head assembly 104. A nozzle 108 is disposed within the processing head assembly 104. The processing head assembly 104 can also include a chamber 114 for receiving a fluid supplied by the fluid source 106. The energy beam 110 and fluid pass through nozzle 108 and impinge on a workpiece 112 in order to cut, weld, heat treat, or otherwise modify the workpiece 112.

In one embodiment, the energy source 102 is a plasma source and the energy beam 110 is a plasma. In another embodiment, the energy source 102 is a laser and the energy beam 110 is a laser beam. In the plasma version, the chamber 114 can be in the form of a plasma chamber. In the laser version, the chamber 114 can be in the form of a plenum.

Figure 2:
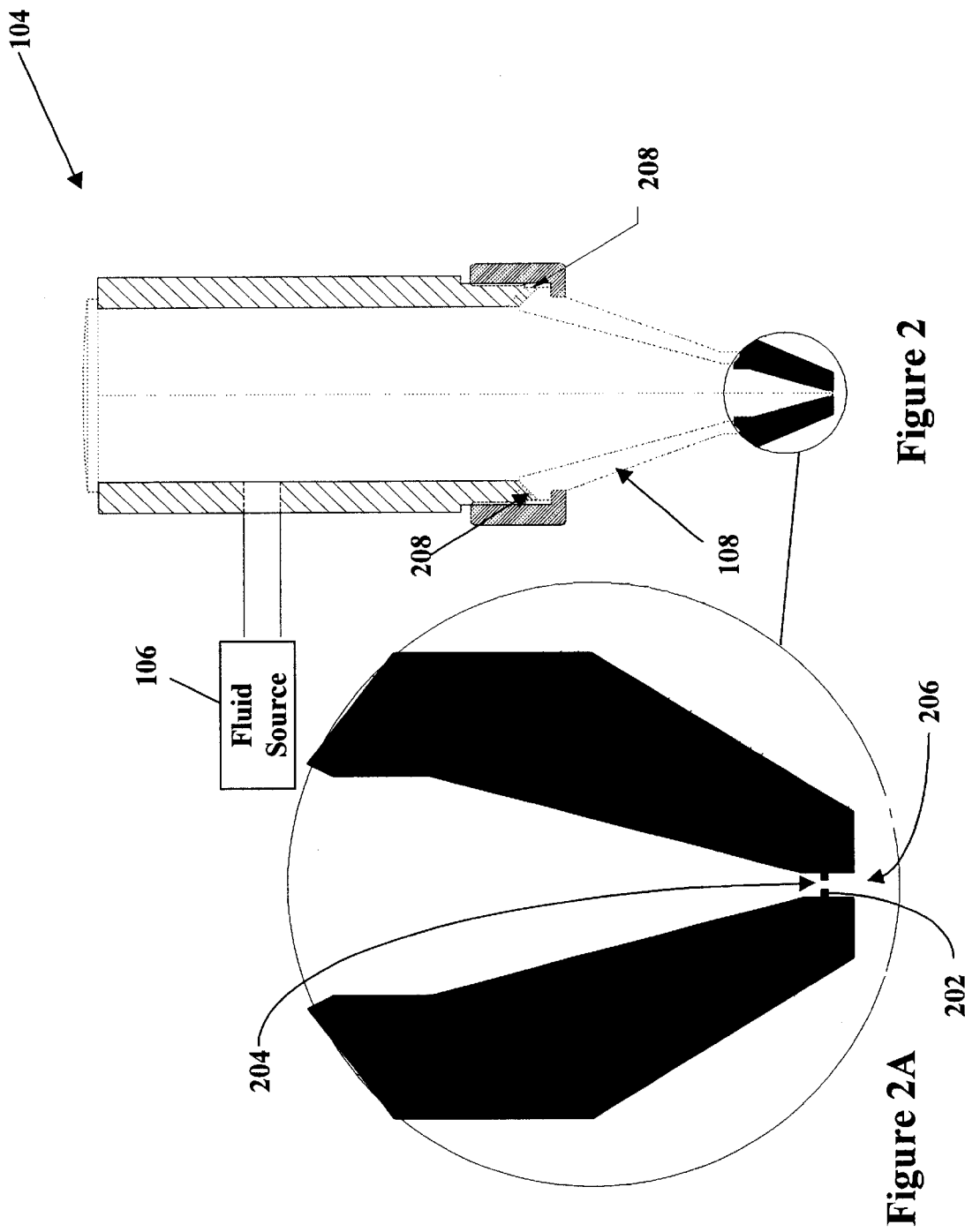
FIG. 2 is a schematic sectional view of a processing head assembly in accordance with an embodiment of the present invention.

FIG. 2 illustrates additional details of the processing head 104 and the nozzle 108. FIG. 2A provides a close-up view of a portion of the nozzle 108. The nozzle includes a central exit orifice 206. A configurable baffle 202 is disposed relative to the nozzle 108. The configurable baffle 202 includes an opening 204 that is perpendicular to an axis of propagation of the energy beam 110 and substantially coincident with the central exit orifice 206.

In one embodiment, the configurable baffle 202, before its first use, does not include the opening 204. On the first use of the configurable baffle 202, the energy beam 110 impinges on it and selectively removes a portion of the configurable baffle 202. This portion has a dimension that is substantially equivalent to the cross-sectional area of the energy beam 110. Because this selective removal forms the opening 204, the latter also has a dimension that is substantially equivalent to the cross-sectional area of the energy beam 110.

The configurable baffle 202 serves as a distributed flow resistance structure that serves to configure the velocity distributions of the flow of a fluid, such as an assist gas, passing through the nozzle 108. In one embodiment, the configurable baffle 202 is metallic. In other embodiments, the configurable baffle 202 is a grid, permeable membrane, or porous membrane. Irrespective of the composition of the configurable baffle 202, the opening 204 is always formed by the selective removal of a portion of the configurable baffle 202 by the energy beam 110 when the nozzle 108 and the configurable baffle 202 are installed in a material processing apparatus.

For improved operation, the axis of the nozzle 108 is aligned with an axis of the processing head assembly 104. This ensures the energy beam 110 is centered in the central exit orifice 206 as it passes through the latter en route to the workpiece 112. To maintain this alignment, one embodiment of the invention includes a nozzle 108 that has contoured surfaces 208 that are contoured over a predetermined axial extent. The contoured surfaces 208 mate with adjacent structure of the processing head assembly 104 when installed in the latter. This mating action results in the coaxial alignment of the nozzle 108 and the processing head assembly 104, thereby improving accuracy and quality and extending the operational life of the apparatus.

Figure 3:
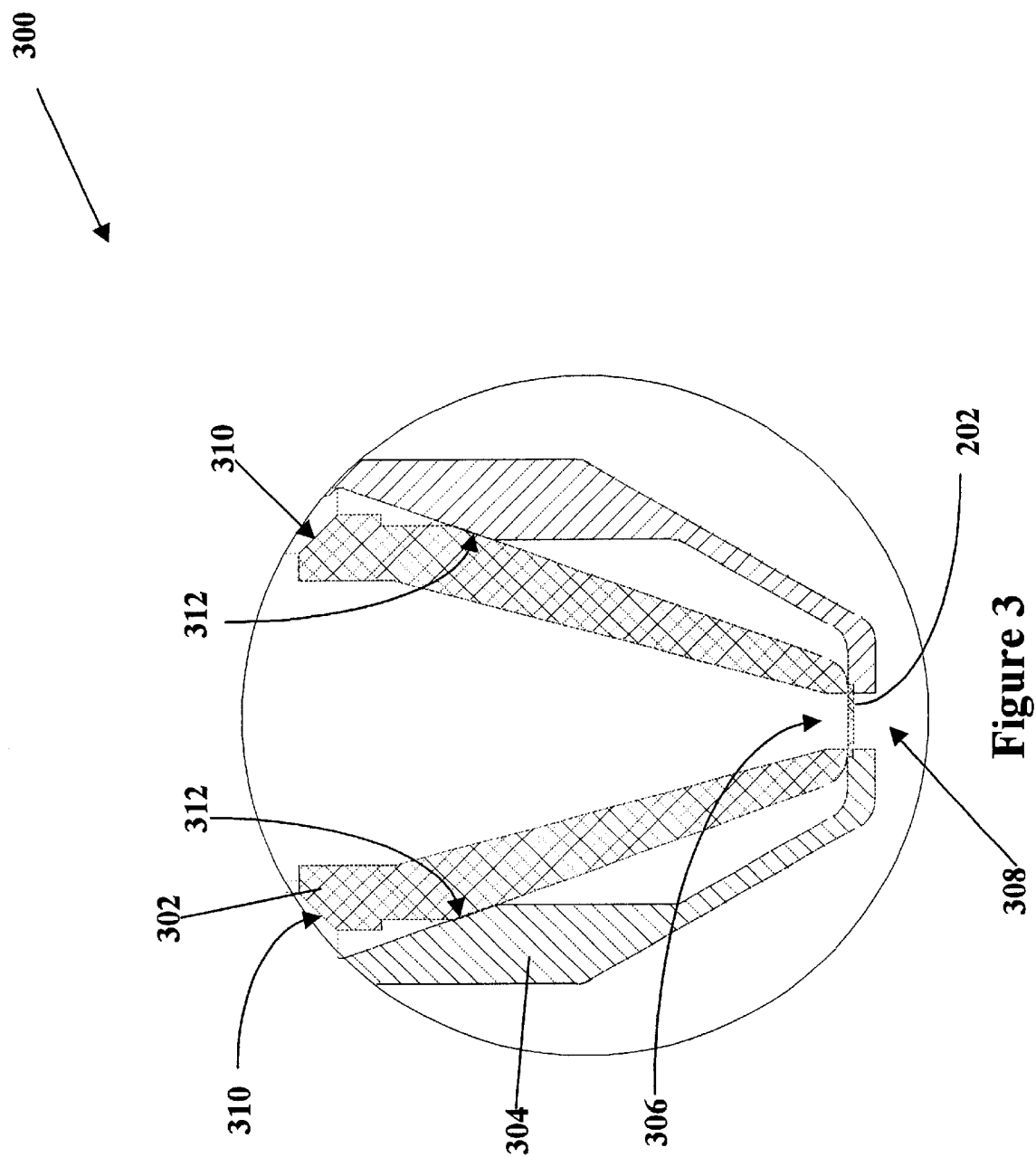
FIG. 3 is a schematic sectional view of a consumable in accordance with an embodiment of the present invention.

The "working end" of the processing head assembly 104 is that portion closest to the workpiece 112. The working end typically degrades from use because of its direct exposure to the extreme conditions present on the workpiece 112 during material processing. These conditions include, for example, high temperature and a local atmosphere of highly reactive gas. To maintain proper operation and extend the operational life of the apparatus, another embodiment of the invention provides a two-piece consumable at the working end. As detailed in FIG. 3, this consumable 300 includes an inner nozzle component 302 and an outer member 304 that circumscribes the inner nozzle component 302. The inner nozzle component 302 includes an inner nozzle central exit orifice 306 and the outer member 304 includes an outer central exit orifice 308. The configurable baffle 202 is disposed relative to the inner nozzle component 302 and the outer member 304. The configurable baffle 202 is positioned to be coincident with the inner nozzle central exit orifice 306 and the outer central exit orifice 308.

Other embodiments include those where the outer member 304 is another nozzle (i.e., an "outer nozzle") or a shield. In either case, an objective of such a configuration is to allow the easy replacement of those portions of the working end subject to deterioration from use. The consumable can also include a threaded surface to engage with a mating threaded surface of adjacent structure when installed in the processing head assembly 104.

To ensure proper alignment results after replacement of the consumable, circumscribing contoured surfaces 310, 312 are employed on both the inner nozzle component 302 and the outer member 304. The circumscribing contoured surfaces 310, 312 mate with adjacent structure thereby resulting in the coaxial alignment of the inner nozzle component 302, the outer member 304, and the energy beam 110. This improves accuracy and quality, and extends the operational life of the apparatus.

Figure 4:
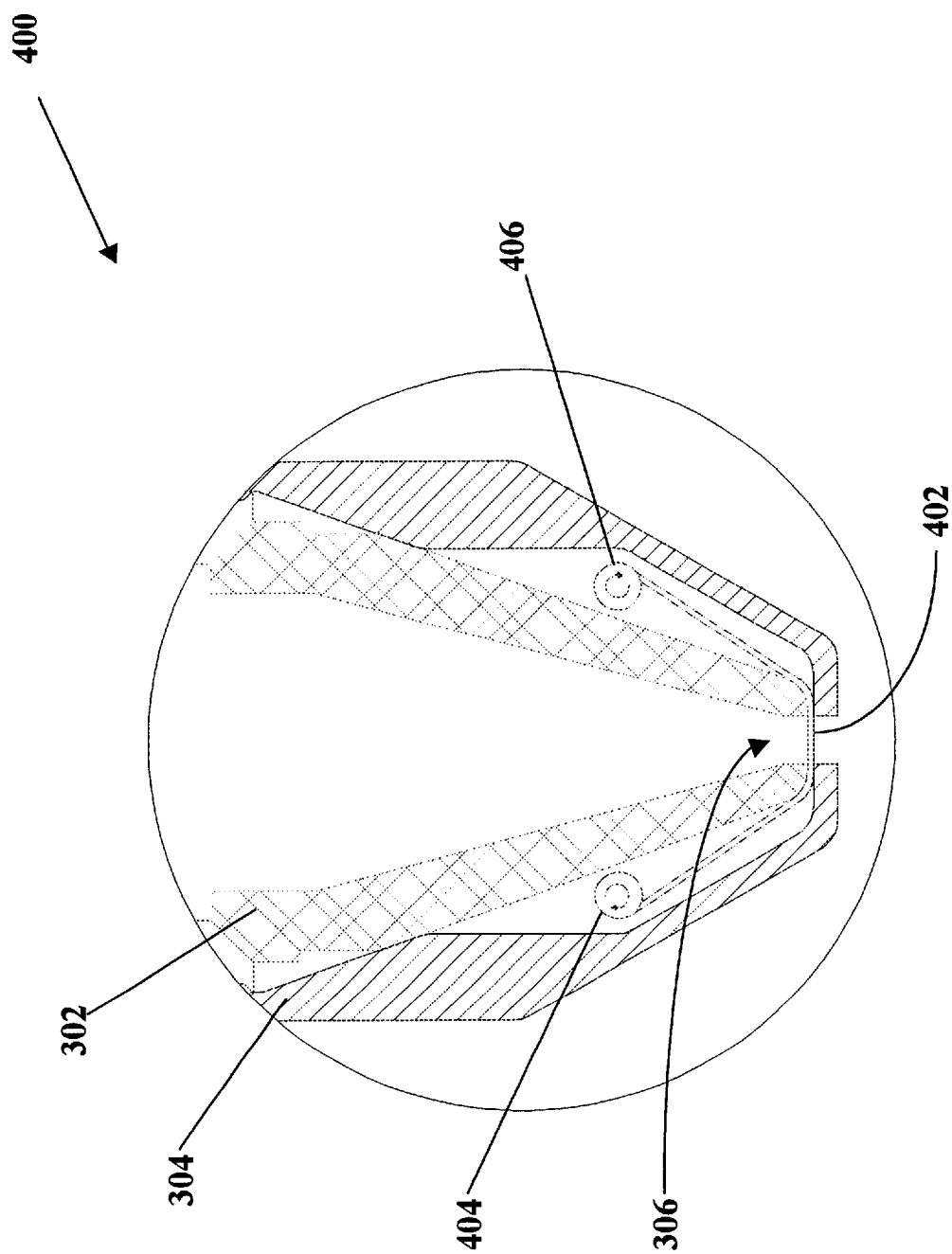
FIG. 4 is a schematic sectional view of a renewable baffle structure in accordance with an embodiment of the present invention.

During operation, the configurable baffle 202 degrades from use and must be replaced. To facilitate this replacement and avoid potentially time consuming disassembly and reassembly processes, another embodiment allows for the in situ replacement of the configurable baffle 202. FIG. 4 shows this embodiment as a renewable baffle structure 400. This embodiment includes a quantity of baffle material 402 and a mechanism to move the baffle material 402. This movement results in one portion of the baffle material 402, typically the degraded portion, being moved away from the inner nozzle central exit orifice 306. The movement further results in another portion of the baffle material 402, typically an unused portion, being moved to a position coincident with the inner nozzle central exit orifice 306.

As described above, there is no opening in the unused portion of the baffle material 402. According to this embodiment of the invention, the energy beam 110 impinges on the baffle material 402, thereby selectively removing a portion of it. This portion has a dimension that is substantially equivalent to the cross-sectional area of the energy beam 110. This selective removal forms an opening in the baffle material 402 that has a dimension substantially equivalent to the cross-sectional area of the energy beam 110.

The mechanism to move the baffle material 402 can have any convenient design known in the art. In one embodiment, the mechanism includes a baffle take-up reel 404 and a baffle supply reel 406. The unused portion of the baffle material 402 is disposed on the baffle supply reel 406. The used portion of the baffle material 402 is disposed on the baffle take-up reel 404. During the in situ replacement of the baffle material 402, the reels 404, 406 are operated (e.g., rotated) to move an unused potion of the baffle material 402 in to position coincident with the inner nozzle central exit orifice 306. The degraded portion of the baffle material 402 is simultaneously moved away from the inner nozzle central exit orifice 306 and on to the baffle take-up reel 404. The energy beam 110 is then activated to form an opening in the baffle material 402. This configures the baffle material 402, and readies the apparatus for use.

Figure 5:
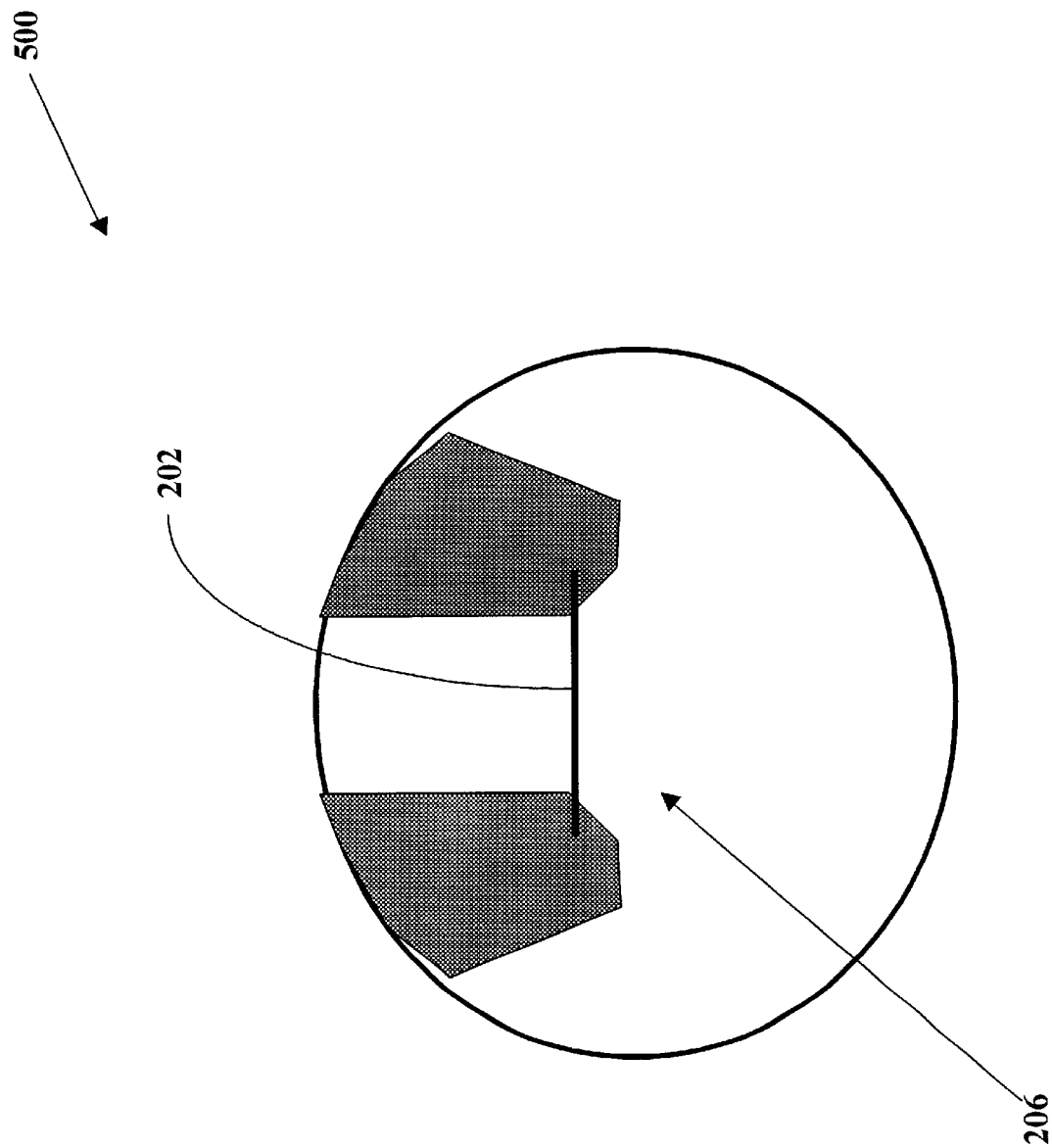
FIG. 5 is a schematic sectional view of a friction fit configuration in accordance with an embodiment of the present invention.

Another embodiment of the invention is detailed in FIG. 5, which shows a friction fit configuration 500. In this embodiment, the configurable baffle 202 has a configuration that provides a friction fit between it and the central exit orifice 206. This is typically achieved by including a frame (not shown) around the configurable baffle 202. This frame is sized to create the friction fit. As the configurable baffle 202 deteriorates from use, the operator removes it by overcoming the frictional force. The operator then inserts a new configurable baffle 202 with surrounding frame into the central exit orifice 206 by, for example, physically "pressing" the former into the latter. The resulting frictional force caused by the appropriately sized frame is sufficient to capture the configurable baffle 202 in the central exit orifice 206. Similar to the other embodiments discussed above, the energy beam 110 forms an opening in the configurable baffle 202 perpendicular to an axis of propagation of the former. This opening (not shown in FIG. 5) is substantially coincident with the central exit orifice 206 and has a dimension substantially equivalent to the cross-sectional area of the energy beam 110. This prepares the configurable baffle 202 for use.

A further embodiment of the invention includes a method to form a configurable baffle disposed relative to a nozzle used in a processing head assembly. This method includes securing a configurable baffle relative to the central exit orifice of the nozzle, emitting an energy beam from an energy source, and directing the energy beam onto the configurable baffle. The energy beam then selectively removes a portion of the configurable baffle, thereby defining an opening in the latter. Because the energy beam created the opening, the opening is coincident with the central exit orifice and has a dimension that is substantially equivalent to the cross-sectional area of the energy beam. In one embodiment, the energy source can be a plasma source and the energy beam can be a plasma. In another embodiment, the energy source can be a laser source and the energy beam can be a laser beam.

Another embodiment of the invention includes a method of processing a workpiece. In this embodiment, an energy source and a processing head assembly are provided. The processing head assembly includes a chamber, a nozzle with a central exit orifice, and a configurable baffle disposed relative to the nozzle. Both the nozzle and the configurable baffle are in fluid communication with the chamber.

The energy source is activated to transmit an energy beam through the configurable baffle and the central exit orifice. Concurrently, an assist gas is directed into the chamber for transport through and to the configurable baffle and the central exit orifice. The configurable baffle includes an opening formed by the energy beam. This opening is perpendicular to an axis of propagation of the energy beam, is coincident with the central exit orifice, and has a dimension that is substantially equivalent to the cross-sectional area of the energy beam. Because of this opening, the velocity of the gas flow surrounding the energy beam is reduced relative to the velocity of the gas flow through the cross-sectional area of the energy beam. Both the energy beam and gas flows of differing velocity are then directed onto the workpiece for processing. Note that in one embodiment, the energy source can be a plasma source and the energy beam can be a plasma. In this embodiment, the chamber is a plasma chamber. In another embodiment, the energy source can be a laser source and the energy beam can be a laser beam. In this second embodiment, the chamber is a plenum and the processing head assembly is in optical communication with the laser source.

From the foregoing, it will be appreciated that the configurable baffle provided by the invention affords a simple and effective way to tailor the flow velocity of a fluid, such as an assist gas, used in material processing apparatus. The problems of low quality and inaccurate cuts caused by sub-optimal fluid flows are largely eliminated.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes which come within the meaning and range of equivalency of the claims are therefore intended to be embraced therein.

What is claimed is:

1. A material processing apparatus comprising:
    an energy source providing an energy beam;
    a processing head assembly in communication with a fluid source and the energy source for passing the fluid and the energy beam;
    a nozzle disposed in the processing head assembly, the nozzle defining a central exit orifice through which the fluid and the energy beam pass; and
    a configurable baffle disposed adjacent to a distal end of the nozzle for configuring the fluid flow passing through the central exit orifice.

2. The material processing apparatus of claim 1, wherein the energy source comprises a plasma source and the energy beam comprises a plasma.

3. The material processing apparatus of claim 1, wherein the energy source comprises a laser source and the energy beam comprises a laser beam.

4. The material processing apparatus of claim 1, wherein the processing head assembly further comprises a chamber for receiving the fluid.

5. The material processing apparatus of claim 4, wherein the chamber is a plenum.

6. The material processing apparatus of claim 4, wherein the chamber is a plasma chamber.

7. The material processing apparatus of claim 1, wherein the configurable baffle defines an opening perpendicular to an axis of propagation of the energy beam, the opening substantially coincident with the central exit orifice, and the opening having a dimension substantially equivalent to the cross-sectional area of the energy beam.

8. The material processing apparatus of claim 7 wherein the opening is formed at least in part by the energy beam.

9. The material processing apparatus of claim 7 wherein the configurable baffle defines a plurality of secondary openings surrounding the opening.

10. A processing head assembly comprising:
    a chamber for receiving a fluid;
    a nozzle in fluid communication with the chamber, the nozzle defining a central exit orifice through which the fluid passes; and
    a configurable baffle disposed adjacent to a distal end of the nozzle for configuring the fluid flow passing through the central exit orifice.

11. The processing head assembly of claim 10, wherein the chamber is a plenum.

12. The processing head assembly of claim 10, wherein the chamber is a plasma chamber.

13. The processing head assembly of claim 10, wherein the configurable baffle defines an opening perpendicular to an axis of propagation of an energy beam impinging on the opening, the opening substantially coincident with the central exit orifice, and the opening having a dimension substantially equivalent to the cross-sectional area of the energy beam.

14. The processing head assembly of claim 13, wherein the energy beam comprises a plasma.

15. The processing head assembly of claim 13 wherein the opening is formed at least in part by the energy beam.

16. The processing head assembly of claim 13 wherein the configurable baffle defines a plurality of secondary openings surrounding the opening.

17. The processing head assembly of claim 13, wherein the energy beam comprises a laser beam.

18. The processing head assembly of claim 10, wherein the configurable baffle comprises a distributed flow resistance structure intended to configure the velocity distributions of the flow.

19. The processing head assembly of claim 18, wherein the distributed flow resistance structure further comprises a metallic element.

20. The processing head assembly of claim 18, wherein the distributed flow resistance structure further comprises a grid.

21. The processing head assembly of claim 18, wherein the distributed flow resistance structure further comprises a permeable membrane.

22. The processing head assembly of claim 18, wherein the distributed flow resistance structure further comprises a porous membrane.

23. A nozzle for use in a laser-equipped material processing apparatus, the nozzle comprising:
    a body forming an axis, the body having an outer surface continuously circumferentially contoured and contoured over a predetermined axial extent thereof for mating with adjacent structure when installed in a processing head assembly, so as to align the axis of the nozzle with an axis of the processing head assembly.

24. A material processing apparatus comprising:
    an energy source providing an energy beam;
    a processing head assembly in communication with a fluid source and the energy source for passing the fluid and the energy beam;
    a nozzle disposed in the processing head assembly, the nozzle defining a central exit orifice through which the fluid and the energy beam pass; and
    a configurable baffle disposed adjacent to a distal end of the nozzle for configuring the fluid flow passing through the central exit orifice such that the velocity of the fluid flow surrounding the energy beam is less than the velocity of the fluid flow through the cross-sectional area of the energy beam.

25. A processing head assembly comprising:
    a chamber for receiving a fluid;
    a nozzle in fluid communication with the chamber, the nozzle defining a central exit orifice through which the fluid passes; and
    a configurable baffle disposed adjacent to a distal end of the nozzle for configuring the fluid flow passing through the central exit orifice such that the velocity of the fluid flow through a cross-sectional portion of the configurable baffle is greater than the velocity of the fluid flow outside the cross-sectional portion.

26. A nozzle apparatus comprising:
a nozzle defining a central exit orifice; and
a configurable baffle disposed adjacent to a distal end of the nozzle.

27. The nozzle apparatus of claim 26, wherein the configurable baffle further comprises a frame sized to achieve a friction fit with the central exit orifice.

28. The nozzle apparatus of claim 26, wherein the configurable baffle defines an opening perpendicular to an axis of propagation of an energy beam impinging on the opening, the opening substantially coincident with the central exit orifice, and the opening having a dimension substantially equivalent to the cross-sectional area of the energy beam.

29. The nozzle apparatus of claim 28 wherein the opening is formed at least in part by the energy beam.

30. The nozzle apparatus of claim 28 wherein the configurable baffle defines a plurality of secondary openings surrounding the opening.

31. A nozzle apparatus comprising:
a nozzle defining a central exit orifice; and
a configurable baffle disposed adjacent to a distal end of the nozzle for configuring a fluid flow passing through the central exit orifice such that the velocity of the fluid flow through a cross-sectional portion of the configurable baffle is greater than the velocity of the fluid flow outside the cross-sectional portion.

32. A method of processing a workpiece comprising the steps of:
providing an energy source;
providing a processing head assembly having a chamber, a nozzle defining a central exit orifice and a configurable baffle disposed relative to the nozzle, the nozzle and the configurable baffle being in fluid communication with the chamber;
activating the energy source to transmit an energy beam through the configurable baffle and the central exit orifice;
directing an assist gas to the chamber for transport to and through the configurable baffle and the central exit orifice, thereby reducing the velocity of the gas flow surrounding the energy beam relative to the velocity of the gas flow through the cross-sectional area of the energy beam; and
directing the energy beam on to the workpiece.

33. The method of claim 32, wherein the energy source further comprises a plasma source, the energy beam further comprises a plasma, and the chamber is a plasma chamber.

34. The method of claim 32, wherein the energy source further comprises a laser source, the energy beam further comprises a laser beam, and the chamber is a plenum.

35. A material processing apparatus comprising:
a gas source;
a laser source providing a laser beam;
a processing head assembly in optical communication with the laser source;
a plenum for receiving the gas, the plenum in fluid communication with the processing head assembly;
a nozzle disposed in the processing head assembly, the nozzle defining a central exit orifice through which the gas and the laser beam pass; and
a configurable baffle disposed in the nozzle for regulating the gas passing through the central exit orifice, the configurable baffle defining an opening perpendicular to an axis of propagation of the laser beam, the opening substantially coincident with the central exit orifice, and the opening having a dimension substantially equivalent to the cross-sectional area of the laser beam.

36. The material processing apparatus of claim 35 wherein the opening is formed at least in part by the laser beam.

37. The material processing apparatus of claim 35 wherein the configurable baffle defines a plurality of secondary openings surrounding the opening.

38. A processing head assembly comprising:
a plenum for receiving a gas;
a nozzle in fluid communication with the plenum, the nozzle defining a central exit orifice; and
a configurable baffle disposed relative to the nozzle for regulating the gas passing through the central exit orifice, the configurable baffle further comprising a metallic grid and defining an opening perpendicular to an axis of propagation of a laser beam passing through the opening, the opening substantially coincident with the central exit orifice, and the opening having a dimension substantially equivalent to the cross-sectional area of the laser beam.

39. The processing head assembly of claim 38 wherein the opening is formed at least in part by the laser beam.

40. The processing head assembly of claim 38 wherein the configurable baffle defines a plurality of secondary openings surrounding the opening.

41. A method of forming a configurable baffle disposed relative to a nozzle for use in a processing head assembly, the method comprising the steps of:
securing the configurable baffle relative to a central exit orifice of the nozzle;
emitting an energy beam from an energy source; and
directing the energy beam onto the configurable baffle to selectively remove a portion of the configurable baffle, thereby defining a baffle opening that is coincident with the central exit orifice.

42. The method of claim 41, wherein the energy source further comprises a plasma source and the energy beam further comprises a plasma.

43. The method of claim 41, wherein the energy source further comprises a laser source and the energy beam further comprises a laser beam.

44. A consumable for use in a material processing apparatus, the consumable comprising:
an inner nozzle component having an inner nozzle central exit orifice;
an outer member circumscribing the inner nozzle component so as to achieve a secure fit between the outer member and the inner nozzle component, the outer member having an outer central exit orifice aligned with the inner nozzle central exit orifice; and
a configurable baffle disposed relative to the inner nozzle component and the outer member, the configurable baffle coincident with the inner nozzle central exit orifice and the outer central exit orifice.

45. The consumable of claim 44, wherein the outer member further comprises an outer nozzle.

46. The consumable of claim 44, wherein the outer member further comprises a shield.

47. The consumable of claim 44, wherein the configurable baffle further comprises:
a quantity of baffle material; and a mechanism to move a first portion of baffle material to a position away from the inner nozzle central exit orifice and to move a second portion of baffle material to a position coincident with the inner nozzle central exit orifice.

48. The consumable of claim 47, wherein the mechanism further comprises:

a baffle take-up reel on which the first portion of baffle material is disposed; and a baffle supply reel on which the second portion of baffle material is disposed.

49. The consumable of claim 44, wherein the consumable further comprises a threaded surface for engaging a mating threaded surface of adjacent structure when installed in a processing head assembly.

* * * * *